(12) United States Patent
Pickering

(10) Patent No.: US 11,873,865 B2
(45) Date of Patent: Jan. 16, 2024

(54) TOLERANCE RING AND ASSEMBLY

(71) Applicant: SAINT-GOBAIN PERFORMANCE PLASTICS RENCOL LIMITED, Coventry (GB)

(72) Inventor: Llewelyn Pickering, Pandy (GB)

(73) Assignee: SAINT-GOBAIN PERFORMANCE PLASTICS RENCOL LIMITED, Coventry (GB)

( * ) Notice: Subject to any disclaimer, the term of this patent is extended or adjusted under 35 U.S.C. 154(b) by 862 days.

(21) Appl. No.: 16/511,240

(22) Filed: Jul. 15, 2019

(65) Prior Publication Data
US 2020/0025256 A1 Jan. 23, 2020

Related U.S. Application Data

(60) Provisional application No. 62/699,062, filed on Jul. 17, 2018.

(51) Int. Cl.
*F16D 1/08* (2006.01)
*F16B 7/04* (2006.01)

(52) U.S. Cl.
CPC .......... *F16D 1/0835* (2013.01); *F16B 7/0413* (2013.01); *F16D 2200/003* (2013.01);
(Continued)

(58) Field of Classification Search
CPC ............. F16D 1/0835; F16D 2200/003; F16D 2250/0046; F16D 2200/0021; F16D 2300/10; F16B 7/0413
See application file for complete search history.

(56) References Cited

U.S. PATENT DOCUMENTS 4,647,803 A 3/1987 von der Heide et al.
4,789,607 A 12/1988 Fujita et al.
(Continued)

FOREIGN PATENT DOCUMENTS

CA 2203181 C 8/2001
CN 201369628 Y 12/2009
(Continued)

OTHER PUBLICATIONS

International Search Report and Written Opinion for PCT/EP2019/068964, dated Dec. 20, 2019, 19 pages.

*Primary Examiner* — Pamela Rodriguez
(74) *Attorney, Agent, or Firm* — Abel Schillinger, LLP; Ann Palma

(57) ABSTRACT

A tolerance ring including a substrate, and an overlying layer including at least one of a thermal enhancement layer and a retention layer, the thermal enhancement layer including at least one of i) Vickers hardness <400 VPM or ii) a thermal conductivity >100 W/m·K, the tolerance ring being adapted to provide at least one of a) a thermal transfer between the inner member and the outer member, b) a coefficient of friction between the retention layer and the outer member, $\mu_1$, and a coefficient of friction between the substrate and the outer member, $\mu_2$, and where $\mu_1 > \mu_2$, or c) a retention force, Rf, between the inner member and the outer member, and the assembly has an assembly force, Af, and where Rf>0.1 Af, wherein the tolerance ring includes a plurality of projections protruding radially inward or radially outward.

20 Claims, 3 Drawing Sheets

(52) U.S. Cl.
CPC ............... *F16D 2200/0021* (2013.01); *F16D 2250/0046* (2013.01); *F16D 2300/10* (2013.01)

(56) References Cited

U.S. PATENT DOCUMENTS

| | | |
|---|---|---|
| 5,241,229 A | 8/1993 | Katakura et al. |
| 5,619,389 A | 4/1997 | Dunfield et al. |
| 5,871,668 A | 2/1999 | Heimann et al. |
| 6,499,209 B1 | 12/2002 | Landin et al. |
| 6,512,314 B1 | 1/2003 | Nakanishi |
| 6,905,779 B2 | 6/2005 | Sakai et al. |
| 2002/0135244 A1 | 9/2002 | Strong et al. |
| 2006/0177596 A1 | 8/2006 | De Meyer et al. |
| 2012/0183422 A1* | 7/2012 | Bahmata ............... H02K 1/185 417/423.15 |
| 2013/0315654 A1 | 11/2013 | Nias et al. |
| 2014/0187336 A1 | 7/2014 | Hagan |
| 2014/0225373 A1 | 8/2014 | Roivainen et al. |
| 2015/0000098 A1* | 1/2015 | Slayne ............... G11B 5/4813 29/428 |
| 2015/0114549 A1 | 4/2015 | Slayne et al. |
| 2018/0306248 A1* | 10/2018 | Itta ....................... F16D 1/0835 |
| 2019/0101163 A1* | 4/2019 | Haines ................. F16D 1/0835 |
| 2019/0190345 A1* | 6/2019 | Childs ..................... B32B 9/047 |

FOREIGN PATENT DOCUMENTS

| | | | |
|---|---|---|---|
| CN | 103891101 A | | 6/2014 |
| DE | 889534 C | * | 9/1953 |
| DE | 889534 C | | 9/1953 |
| DE | 102012221596 A1 | | 5/2014 |
| DE | 102012221718 A1 | | 5/2014 |
| EP | 1302685 A1 | | 4/2003 |
| FR | 2803127 A1 | | 6/2001 |
| FR | 2803129 A1 | | 6/2001 |
| JP | 2008038990 A | * | 2/2008 |
| WO | 2014079611 A2 | | 5/2014 |
| WO | 2019020730 A1 | | 1/2019 |
| WO | 2019063752 A2 | | 4/2019 |
| WO | 2020016156 A1 | | 1/2020 |

* cited by examiner

TOLERANCE RING AND ASSEMBLY

CROSS-REFERENCE TO RELATED APPLICATION(S)

This application claims priority under 35 U.S.C. § 119(e) to U.S. Patent Application No. 62/699,062 entitled "TOLERANCE RING AND ASSEMBLY," by Llewelyn PICKERING, filed Jul. 17, 2018, which is assigned to the current assignee hereof and incorporated herein by reference in its entirety.

FIELD OF THE DISCLOSURE

The invention generally relates to tolerance rings that are located between assemblies involving moving parts.

BACKGROUND

Commonly, a tolerance ring may be used to couple movement between components. One type tolerance ring may be located in a gap between the outer surface of an inner component and the inner surface of the bore of an outer component. Such an assembly may further include rotary components, such as rotary components including, but not limited to, rotating shafts or rotors adapted to rotate within the assembly. Tolerance rings may also be used in assemblies including generator assemblies, motor assemblies, engine assemblies, clutch assemblies, or holding mechanisms. Such assemblies may be used in automotive applications.

BRIEF DESCRIPTION OF THE DRAWINGS

So that the manner in which the features and advantages are attained and can be understood in more detail, a more thorough description may be had by reference to the embodiments that are illustrated in the appended drawings. However, the drawings illustrate only some embodiments and therefore are not to be considered limiting of the scope.

The use of the same reference symbols in different drawings indicates similar or identical items.

DETAILED DESCRIPTION OF THE INVENTION

Figure 1:
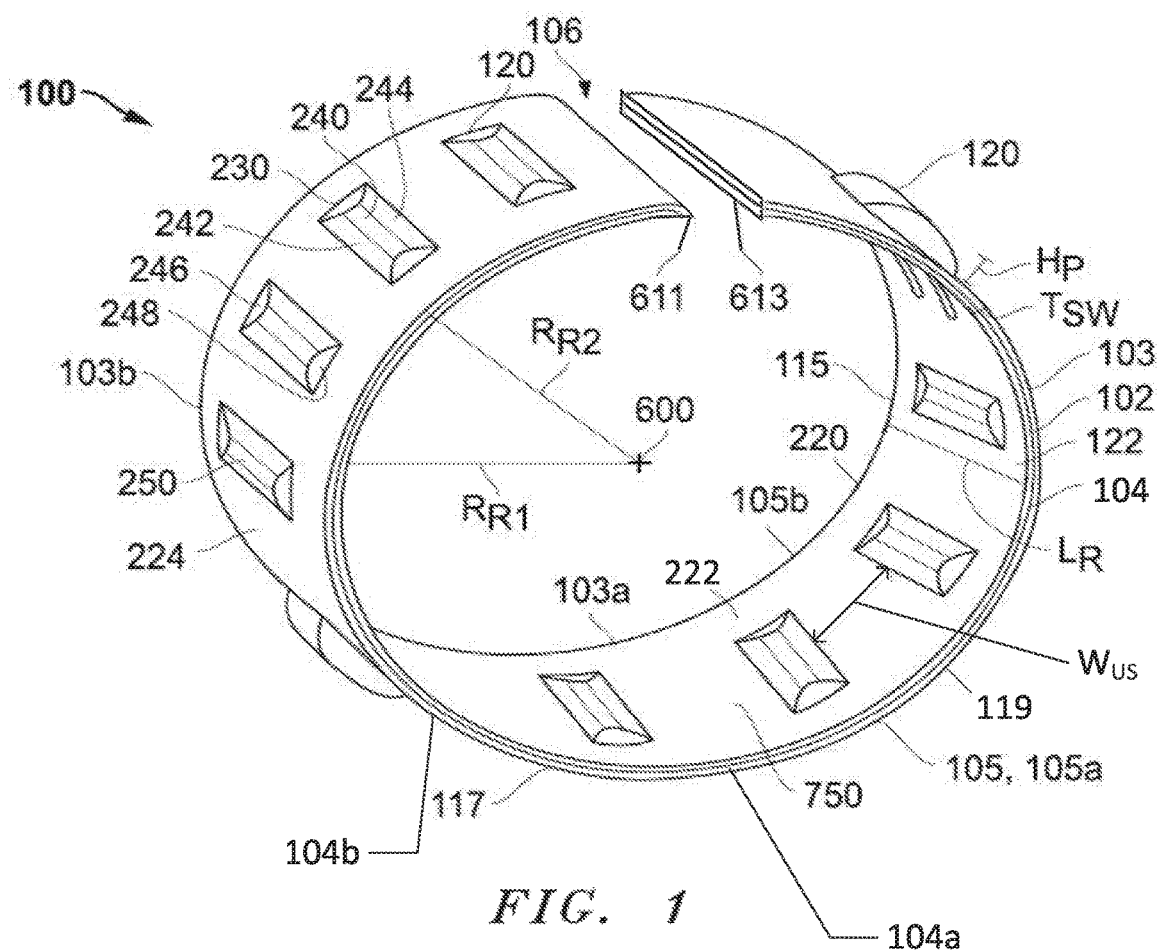
FIG. 1 is a perspective end view of one embodiment of a tolerance ring.

The following description in combination with the figures is provided to assist in understanding the teachings disclosed herein. The following discussion will focus on specific implementations and embodiments of the teachings. This focus is provided to assist in describing the teachings and should not be interpreted as a limitation on the scope or applicability of the teachings. However, other embodiments can be used based on the teachings as disclosed in this application.

The terms "comprises," "comprising," "includes," "including," "has," "having" or any other variation thereof, are intended to cover a non-exclusive inclusion. For example, a method, article, or apparatus that comprises a list of features is not necessarily limited only to those features but may include other features not expressly listed or inherent to such method, article, or apparatus. Further, unless expressly stated to the contrary, "or" refers to an inclusive-or and not to an exclusive-or. For example, a condition A or B is satisfied by any one of the following: A is true (or present) and B is false (or not present), A is false (or not present) and B is true (or present), and both A and B are true (or present).

Also, the use of "a" or "an" is employed to describe elements and components described herein. This is done merely for convenience and to give a general sense of the scope of the invention. This description should be read to include one, at least one, or the singular as also including the plural, or vice versa, unless it is clear that it is meant otherwise. For example, when a single item is described herein, more than one item may be used in place of a single item. Similarly, where more than one item is described herein, a single item may be substituted for that more than one item. Also, the use of "about" or "substantially" is employed to convey spatial or numerical relationships that describe any value or relationship that does not depart from the scope of the invention.

Unless otherwise defined, all technical and scientific terms used herein have the same meaning as commonly understood by one of ordinary skill in the art to which this invention belongs. The materials, methods, and examples are illustrative only and not intended to be limiting. To the extent not described herein, many details regarding specific materials and processing acts are conventional and may be found in textbooks and other sources within the motor/alternator/turbocharger/engine assembly and component arts.

FIGS. 1-4 depict a tolerance ring 100 according to a number of embodiments. The tolerance ring 100 comprises a band 102 of material that may be curved into a tolerance ring-like (substantially annular) shape about a central axis 600. The tolerance ring 100 may have a first axial end 115 and a second axial end 117. The band 102 may include a sidewall 103. In an embodiment, the band 102 may include an interior sidewall 103a and an exterior sidewall 103b.

Figure 2:
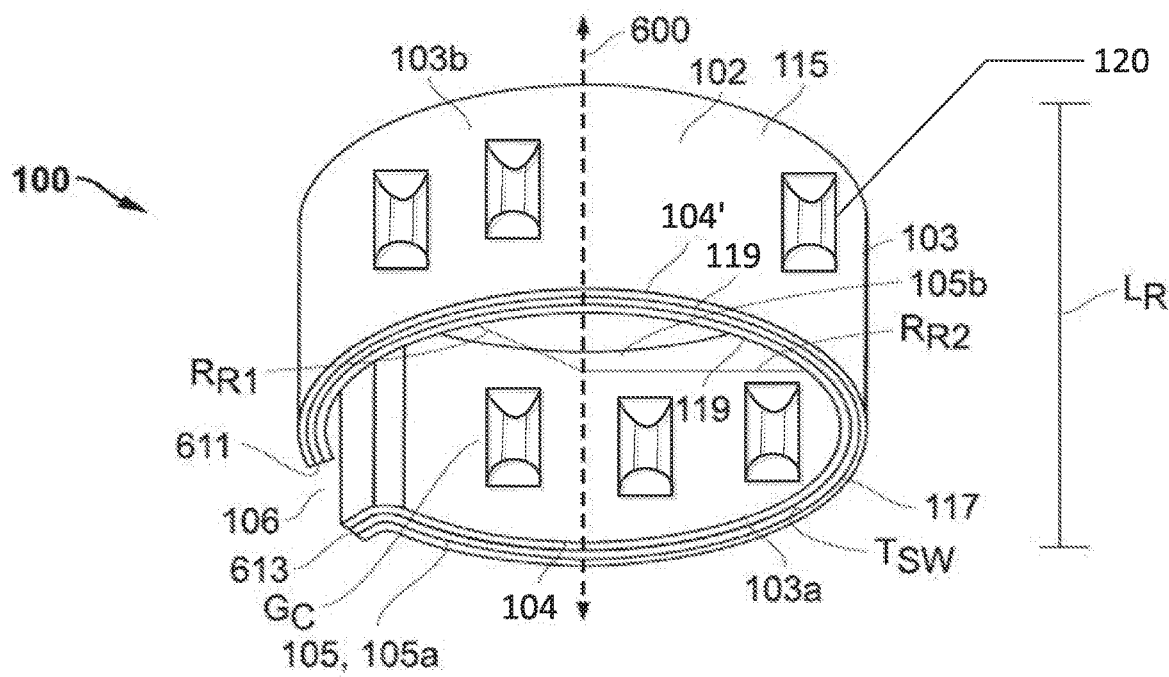
FIG. 2 is a perspective side view of one embodiment of a tolerance ring.

The sidewall 103 may have an axial edge 105. In a number of embodiments, the sidewall 103 may have a first axial edge 105a and a second axial edge 105b. In a number of embodiments, the tolerance ring 100 or band 102 may have a flat, circumferentially-extending unformed section 220 of resilient material along at least one axial end 115, 117 of the sidewall 103. In a number of embodiments, an upper unformed band 220 and a lower unformed band 222 of material may exist at each axial end 105, 107 of the sidewall 103 of the tolerance ring 100. Unformed sections 224 can extend axially along the length of the sidewall 103 between, and extending from, the unformed bands 220, 222. In an embodiment, the tolerance ring 100 and or band 102 may include a gap 106 defining a first circumferential end 611 and a second circumferential end 613. In a number of embodiments, as shown in FIGS. 1-2, the first circumferential end 611 and the second circumferential end 613 of the band 102 do not meet (e.g., it may be formed as a split tolerance ring design), thereby leaving an axial gap 106 adjacent the circumference of the band 102. In other embodiments, the band may be curved so that the ends overlap with one another.

Figure 3:
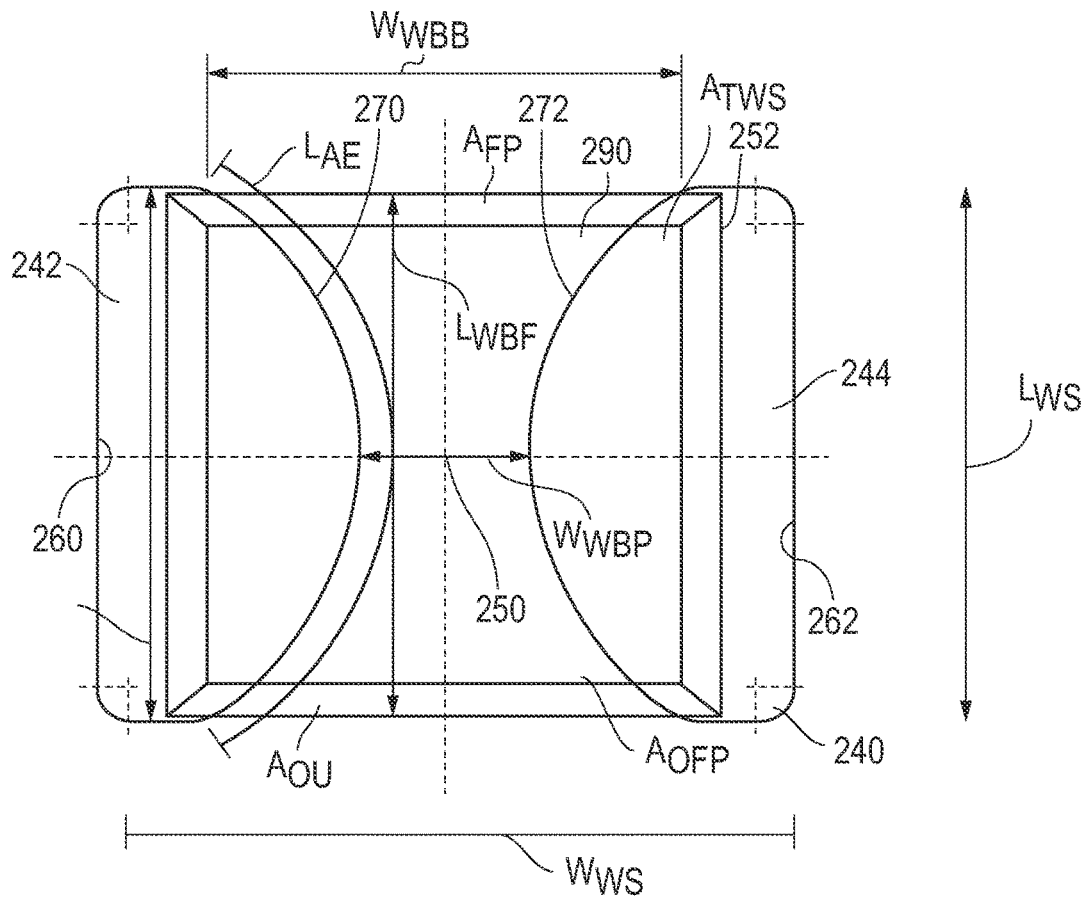
FIG. 3 is a plain view of one embodiment of a projection for a tolerance ring.

In yet further embodiments, as shown in FIG. 3, the band may be a continuous, unbroken tolerance ring. In an embodiment, the interior sidewall 103a may include an inner surface. In an embodiment, the exterior sidewall 103b may include an outer surface. In a number of embodiments, the band 102 may include a plurality of projections 120 around the circumference of the band 102. In a number of embodiments, the tolerance ring 100 may be adapted to fix an inner member 306 and an outer member 302 relative to each other.

In an embodiment, as shown in FIGS. 1-4, the tolerance ring 100 can include a composite material. The tolerance ring 100 may include at least one substrate 119 and at least one overlying layer 104. The overlying layer 104 may overlie and/or underlie any portion of the substrate 119. The overlying layer 104 can be continuous or discontinuous over the substrate 119. The inner surface of the interior sidewall 103a may have an overlying layer 104 that conforms to the shape of the band 102. In an embodiment, the outer surface of the exterior sidewall 103b may have an overlying layer 104 that conforms to the shape of the band 102. The overlying layer 104 can be coupled to at least a portion of the substrate 119, most notably the portion of the substrate along a projection 120. In a further embodiment, the overlying layer 104 can be coupled to an entire major surface of the sidewall 103 e.g., the radially inner 103a or radially outer surface 103b of the sidewall 103 as to cover the radial exterior or the radial interior surface of the tolerance ring 100 respectively. In another embodiment, as shown in FIG. 2, the overlying layer 104, 104' can be coupled to an entire major surface of the sidewall 103 e.g., the radially inner 103a and radially outer surface 103b of the sidewall 103 so as to cover the radial exterior and radial interior of the tolerance ring 100. In a particular embodiment, the overlying layer 104 can be coupled to the radially inner surface of the substrate 119 so as to form an interface with another surface of another component. In another, a second substrate 119' may overlie the overlying layer 104. In still another embodiment, a plurality of substrates 119 and plurality of overlying layers 104 may overlie or underlie one another in any configuration. In a number of embodiments, the band 102 and or a plurality of projections 120 may include a plurality of substrates 119 and plurality of overlying layers 104 may overlie or underlie one another in any configuration. In a number of embodiments, a plurality of substrates 119 and plurality of overlying layers 104 may include the band 102 and or a plurality of projections 120.

The overlying layer 104 may include multiple compositions or layers. In a number of embodiments, the overlying layer 104 may include at least one of a thermal enhancement layer 104 a or a retention layer 104 b. In a number of embodiments, the thermal enhancement layer 104 a may have at least one of Vickers hardness <400 VPM and/or a thermal conductivity >100 W/m·K. The thermal enhancement layer 104 a may have both a Vickers hardness <400 VPN and a thermal conductivity >100 W/m·K. In a number of embodiments, the thermal enhancement layer 104 a may allow for the tolerance ring 100 to be adapted to provide heat transfer between the inner member 306 and the outer member 302. In a number of embodiments, the retention layer 104 b may provide a retention force, Rf, between the inner member 306 and the outer member 302, and the assembly has an assembly force, Af, and wherein Rf>0.1 Af. Retention force, Rf, may be defined as the force required to hold the tolerance ring 100 in a static state relative to at least one of the inner component 306 or outer component 302. Assembly force, Af, may be defined as the force required to assemble the tolerance ring 100 with at least one of the inner component 306 or outer component 302 into an assembly 2. In an embodiment, the thermal enhancement layer 104 a and the retention layer 104 b may be a single uniform layer. In another embodiment, the thermal enhancement layer 104 a and the retention layer 104 b may be defined separate layers within the overlying layer 104. In an embodiment, the compositions of the thermal enhancement layer 104 a and the retention layer 104 b may form a composition gradient within the overlying layer 104. In an embodiment, the overlying layer 104 (including at least one of the thermal enhancement layer 104 a or the retention layer 104 b) may define a portion of an exterior surface or radially outer surface or sidewall 103 b of the tolerance ring 100. In an embodiment, the overlying layer 104 (including at least one of the thermal enhancement layer 104 a or the retention layer 104 b) may define a portion of an interior surface or radially inner surface or sidewall 103 a of the tolerance ring 100.

Figure 4:
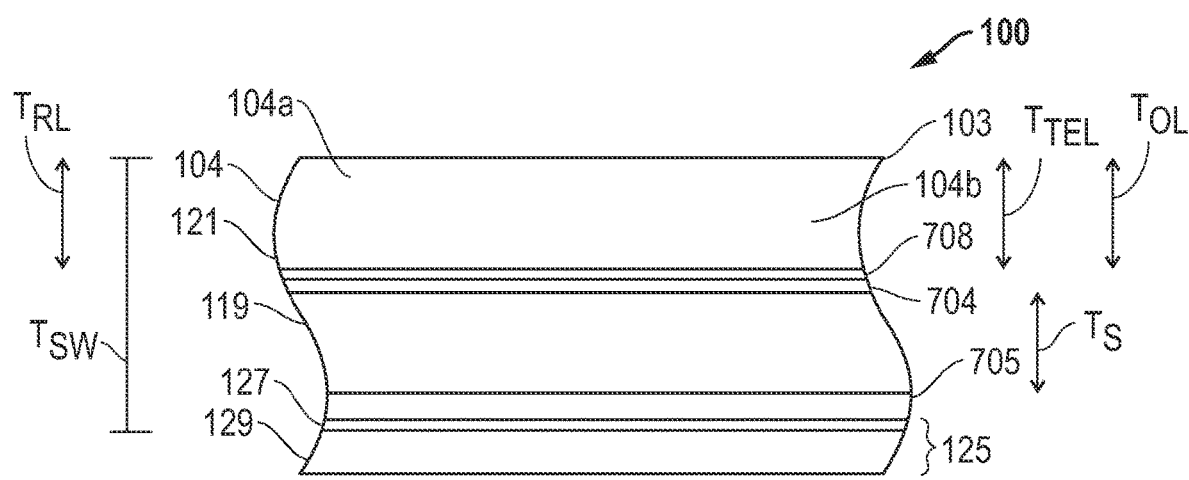
FIG. 4 is a schematic sectional side view of another embodiment of a tolerance ring having layers.

In an embodiment, as shown FIG. 4, the substrate 119 can at least partially include a metal. The metal may include aluminum, zinc, copper, beryllium, magnesium, tin, titanium, tungsten, iron, bronze, alloys thereof, or may be another type. More particularly, the substrate can at least partially include a ferrous alloy such as steel, such as a stainless steel or carbon steel. For example, the substrate 119 can at least partially include a 301 stainless steel. The 301 stainless steel may be annealed, ¼ hard, ½ hard, hard, or full hard. The substrate 119 may include a woven mesh or an expanded metal grid.

In an embodiment, the overlying layer 104 (including at least one of the thermal enhancement layer 104a or the retention layer 104b) can at least partially include a metal. The metal may include aluminum, zinc, copper, beryllium, magnesium, tin, titanium, tungsten, iron, bronze, alloys thereof, or may be another type. The overlying layer 104 (including at least one of the thermal enhancement layer 104a or the retention layer 104b) may include a metal alloy (including the metals listed), an anodized metal (including the metals listed), a passivated metal, or any combination thereof. The overlying layer 104 (including at least one of the thermal enhancement layer 104a or the retention layer 104b) may include a woven mesh or an expanded metal grid. The overlying layer 104 may be surface treated via electroplating, chemical coating, anodic oxidation, hot dipping, vacuum plating, passivating, abrasive treatment, grinding, polishing, burnishing, sandblasting, etching, abrasion, calendaring, galvanizing, knurling, peening, pickling, thermal spraying, surface hardening, metallic cementation, or any other process known in the metalworking arts.

Optionally, the substrate 119 may be coated with corrosion protection layers 704 and 705 to prevent corrosion of the tolerance ring substrate prior to processing. Additionally, a corrosion protection layer 708 can be applied over layer 704. Each of layers 704, 705, and 708 can have a thickness of about 1 to 50 microns, such as about 7 to 15 microns. Layers 704 and 705 can include a phosphate of zinc, iron, manganese, or any combination thereof, or a nano-ceramic layer. Further, layers 704 and 705 can include functional silanes, nano-scaled silane based primers, hydrolyzed silanes, organosilane adhesion promoters, solvent/water based silane primers, chlorinated polyolefins, passivated surfaces, commercially available zinc (mechanical/galvanic) or zinc-nickel coatings, or any combination thereof. Layer 708 can include functional silanes, nano-scaled silane based primers, hydrolyzed silanes, organosilane adhesion promoters, solvent/water based silane primers. Corrosion protection layers 704, 705, and 708 can be removed or retained during processing.

Optionally, the tolerance ring 100 may further include a corrosion resistant coating 125. The corrosion resistant coating 125 can have a thickness of about 1 to 50 microns, such as about 5 to 20 microns, and such as about 7 to 15 microns. The corrosion resistant coating can include an adhesion promoter layer 127 and an epoxy layer 129. The adhesion promoter layer 127 can include a phosphate of zinc, iron, manganese, tin, or any combination thereof, or a nano-ceramic layer. The adhesion promoter layer 127 can include functional silanes, nano-scaled silane based layers, hydrolyzed silanes, organosilane adhesion promoters, solvent/water based silane primers, chlorinated polyolefins, passivated surfaces, commercially available zinc (mechanical/galvanic) or Zinc-Nickel coatings, or any combination thereof. The epoxy layer 129 can be a thermal cured epoxy, a UV cured epoxy, an IR cured epoxy, an electron beam cured epoxy, a radiation cured epoxy, or an air cured epoxy. Further, the epoxy resin can include polyglycidylether, diglycidylether, bisphenol A, bisphenol F, oxirane, oxacyclopropane, ethylenoxide, 1,2-epoxypropane, 2-methyloxirane, 9,10-epoxy-9,10-dihydroanthracene, or any combination thereof. The epoxy resin layer 129 can further include a hardening agent. The hardening agent can include amines, acid anhydrides, phenol novolac hardeners such as phenol novolac poly[N-(4-hydroxyphenyl)maleimide] (PHPMI), resole phenol formaldehydes, fatty amine compounds, polycarbonic anhydrides, polyacrylate, isocyanates, encapsulated polyisocyanates, boron trifluoride amine complexes, chromic-based hardeners, polyamides, or any combination thereof. Generally, acid anhydrides can conform to the formula R—C=O—O—C=O—R' where R can be $C_XH_YX_ZA_U$ as described above. Amines can include aliphatic amines such as monoethylamine, diethylenetriamine, triethylenetetraamine, and the like, alicyclic amines, aromatic amines such as cyclic aliphatic amines, cyclo aliphatic amines, amidoamines, polyamides, dicyandiamides, imidazole derivatives, and the like, or any combination thereof.

In a number of embodiments, the tolerance ring 100 (including at least one of the substrate 119 or the overlying layer 104) can comprise a material with sufficient rigidity to withstand axial and longitudinal forces. The tolerance ring 100 can be formed from a single piece, two pieces, or several pieces joined together by welding, adhesive, fasteners, threading, or any other suitable fastening means.

In some embodiments, the tolerance ring 100 may be formed from a flat strip of resilient material of the substrate 119 (which forms the band 102). Before the strip is bent into its curved shape, the overlying layer 104 (including at least one of the thermal enhancement layer 104a or the retention layer 104b) may be coated, cladded or otherwise disposed onto one surface thereof. In other embodiments, the overlying layer 104 may be coated, cladded or otherwise disposed onto both surfaces of the substrate 119. The overlying layer 104 (including at least one of the thermal enhancement layer 104a or the retention layer 104b) may be deposited via a coating on the substrate 119 through known methods such as, but not limited to, physical or chemical vapor deposition, spraying, plating, powder coating, or through other chemical or electrochemical techniques. The overlying layer 104 (including at least one of the thermal enhancement layer 104a or the retention layer 104b) may be cladded on the substrate 119 through known methods such as, but not limited to, roll bonding, lamination, explosive welding, laser cladding, or through other chemical or electrochemical techniques. The overlying layer 104 may be attached to a surface of the band 102 facing the inner or outer member 302, 306. The overlying layer 104 may be coated, laminated, cladded, or bonded to the band 102 as mentioned above. Laminating, coating, or cladding the overlying layer 104 may provide an even thickness around the band 102. Before or after the overlying layer 104 may be attached to the substrate 119, the resulting layer structure may be stamped (e.g., pressed using a suitably shaped mold, rotary wave forming, etc.) to form projections 120. Thus, at least one of the projections 120 may be formed from both the strip of resilient material and from the overlying layer 104. The material of the overlying layer 104 may be chosen to be flexible to facilitate this stamping step. The overlying layer 104 may be on the radial outside or the radial inside of the band at the interior sidewall 103a or the exterior sidewall 103b. After the projections 120 may be formed, the layered structure may be curved into the tolerance ring-like configuration shown in FIG. 1-3. In the embodiment shown, the overlying layer 104 may be the outer material. In other embodiments, the overlying layer 104 may be the inner material.

In an embodiment, the sidewall 103 can have a thickness $T_{SW}$ in a range of 0.2 mm and 25 mm. In a more particular embodiment, the sidewall 103 can have a thickness $T_{SW}$ in a range of 0.2 mm and 2 mm, such as in a range of 0.25 mm and 1 mm, in a range of 0.3 mm and 1 mm, in a range of 0.35 mm and 1 mm, in a range of 0.4 mm and 1 mm, in a range of 0.45 mm and 1 mm, in a range of 0.5 mm and 1 mm, in a range of 0.55 mm and 1 mm, in a range of 0.6 mm and 1 mm, in a range of 0.65 mm and 1 mm, in a range of 0.7 mm and 1 mm, in a range of 0.75 mm and 1 mm, in a range of 0.8 mm and 1 mm, in a range of 0.85 mm and 1 mm, in a range of 0.9 mm and 1 mm, or even in a range of 0.95 mm and 1 mm. In another embodiment, the thickness $T_{SW}$ can be in a range of 0.2 mm and 0.95 mm, such as in a range of 0.2 mm and 0.9 mm, in a range of 0.2 mm and 0.85 mm, in a range of 0.2 mm and 0.8 mm, in a range of 0.2 mm and 0.75 mm, in a range of 0.2 mm and 0.7 mm, in a range of 0.2 mm and 0.65 mm, in a range of 0.2 mm and 0.6 mm, in a range of 0.2 mm and 0.6 mm, in a range of 0.2 mm and 0.55 mm, in a range of 0.2 mm and 0.5 mm, in a range of 0.2 mm and 0.45 mm, in a range of 0.2 mm and 0.4 mm, in a range of 0.2 mm and 0.35 mm, in a range of 0.2 mm and 0.3 mm, or even in a range of 0.2 mm and 0.25 mm. In a more particular embodiment, the sidewall 103 can have a thickness $T_{SW}$ between 0.2 mm and 2 mm.

In an embodiment, the substrate 119 may have a thickness Ts in the range of 0.075 mm and 25 mm. In a more particular embodiment, the substrate 119 may have a thickness Ts in a range of 0.075 mm and 2 mm, such as in a range of 0.25 mm and 1 mm, in a range of 0.3 mm and 1 mm, in a range of 0.35 mm and 1 mm, in a range of 0.4 mm and 1 mm, in a range of 0.45 mm and 1 mm, in a range of 0.5 mm and 1 mm, in a range of 0.55 mm and 1 mm, in a range of 0.6 mm and 1 mm, in a range of 0.65 mm and 1 mm, in a range of 0.7 mm and 1 mm, in a range of 0.75 mm and 1 mm, in a range of 0.8 mm and 1 mm, in a range of 0.85 mm and 1 mm, in a range of 0.9 mm and 1 mm, or even in a range of 0.95 mm and 1 mm. In another embodiment, the substrate 119 may have a thickness Ts can be in a range of 0.075 mm and 0.95 mm, such as in a range of 0.075 mm and 0.9 mm, in a range of 0.075 mm and 0.85 mm, in a range of 0.075 mm and 0.8 mm, in a range of 0.075 mm and 0.75 mm, in a range of 0.075 mm and 0.7 mm, in a range of 0.075 mm and 0.65 mm, in a range of 0.2 mm and 0.6 mm, in a range of 0.075 mm and 0.6 mm, in a range of 0.075 mm and 0.55 mm, in a range of 0.075 mm and 0.5 mm, in a range of 0.075 mm and 0.45 mm, in a range of 0.075 mm and 0.4 mm, in a range of 0.075 mm and 0.35 mm, in a range of 0.075 mm and 0.3 mm, or even in a range of 0.075 mm and 0.25 mm. In a more particular embodiment, substrate 119 may have a thickness Ts between 0.075 mm and 0.8 mm.

In an embodiment, the overlying layer 104 may have a thickness $T_{OL}$ in a range of 0.01 microns and 500 microns. In a more particular embodiment, the overlying layer 104 may have a thickness $T_{OL}$ in a range of 0.15 microns and 250 microns, such as in a range of 0.2 microns and 200 microns, in a range of 0.3 microns and 150 microns, in a range of 0.35 microns and 125 microns, in a range of 0.4 microns and 115 microns, in a range of 0.45 microns and 100 microns, in a range of 0.5 microns and 90 microns, in a range of 0.55 microns and 85 microns, in a range of 0.6 microns and 75 microns, in a range of 0.65 microns and 65 microns, in a range of 0.7 microns and 50 microns, in a range of 0.75 microns and 45 microns, in a range of 0.8 microns and 40 microns, in a range of 0.85 microns and 35 microns, in a range of 0.9 microns and 30 microns, or even in a range of 0.95 microns and 25 microns. In another embodiment, the overlying layer 104 may have a thickness $T_{OL}$ in a range of 0.2 microns and 500 microns, such as in a range of 0.2 microns and 250 microns, in a range of 0.2 microns and 150 microns, in a range of 0.2 microns and 125 microns, in a range of 0.2 microns and 100 microns, in a range of 0.2 microns and 95 microns, in a range of 0.2 microns and 90 microns, in a range of 0.2 microns and 85 microns, in a range of 0.2 microns and 80 microns, in a range of 0.2 microns and 75 microns, in a range of 0.2 microns and 70 microns, in a range of 0.2 microns and 65 microns, in a range of 0.2 microns and 60 microns, in a range of 0.2 microns and 50 microns, in a range of 0.2 microns and 25 microns, or even in a range of 0.2 microns and 10 microns. In a more particular embodiment, the overlying layer 104 may have a thickness $T_{OL}$ between 100 microns and 200 microns.

In an embodiment, the thermal enhancement layer 104a may have a thickness $T_{TEL}$ in in a range of 0.15 microns and 500 microns, such as in a range of 0.2 microns and 200 microns, in a range of 0.3 microns and 150 microns, in a range of 0.35 microns and 125 microns, in a range of 0.4 microns and 115 microns, in a range of 0.45 microns and 100 microns, in a range of 0.5 microns and 90 microns, in a range of 0.55 microns and 85 microns, in a range of 0.6 microns and 75 microns, in a range of 0.65 microns and 65 microns, in a range of 0.7 microns and 50 microns, in a range of 0.75 microns and 45 microns, in a range of 0.8 microns and 40 microns, in a range of 0.85 microns and 35 microns, in a range of 0.9 microns and 30 microns, or even in a range of 0.95 microns and 25 microns. In another embodiment, the thermal enhancement layer 104a may have a thickness $T_{TEL}$ in a range of 0.2 microns and 500 microns, such as in a range of 0.2 microns and 250 microns, in a range of 0.2 microns and 150 microns, in a range of 0.2 microns and 125 microns, in a range of 0.2 microns and 100 microns, in a range of 0.2 microns and 95 microns, in a range of 0.2 microns and 90 microns, in a range of 0.2 microns and 85 microns, in a range of 0.2 microns and 80 microns, in a range of 0.2 microns and 75 microns, in a range of 0.2 microns and 70 microns, in a range of 0.2 microns and 65 microns, in a range of 0.2 microns and 60 microns, in a range of 0.2 microns and 50 microns, in a range of 0.2 microns and 25 microns, or even in a range of 0.2 microns and 10 microns. In a more particular embodiment, the thermal enhancement layer 104a may have a thickness $T_{TEL}$ between 100 microns and 200 microns.

In an embodiment, the retention layer 104b may have a thickness $T_R$ in in a range of 0.15 microns and 500 microns, such as in a range of 0.2 microns and 200 microns, in a range of 0.3 microns and 150 microns, in a range of 0.35 microns and 125 microns, in a range of 0.4 microns and 115 microns, in a range of 0.45 microns and 100 microns, in a range of 0.5 microns and 90 microns, in a range of 0.55 microns and 85 microns, in a range of 0.6 microns and 75 microns, in a range of 0.65 microns and 65 microns, in a range of 0.7 microns and 50 microns, in a range of 0.75 microns and 45 microns, in a range of 0.8 microns and 40 microns, in a range of 0.85 microns and 35 microns, in a range of 0.9 microns and 30 microns, or even in a range of 0.95 microns and 25 microns. In another embodiment, the retention layer 104b may have a thickness $T_R$ in a range of 0.2 microns and 500 microns, such as in a range of 0.2 microns and 250 microns, in a range of 0.2 microns and 150 microns, in a range of 0.2 microns and 125 microns, in a range of 0.2 microns and 100 microns, in a range of 0.2 microns and 95 microns, in a range of 0.2 microns and 90 microns, in a range of 0.2 microns and 85 microns, in a range of 0.2 microns and 80 microns, in a range of 0.2 microns and 75 microns, in a range of 0.2 microns and 70 microns, in a range of 0.2 microns and 65 microns, in a range of 0.2 microns and 60 microns, in a range of 0.2 microns and 50 microns, in a range of 0.2 microns and 25 microns, or even in a range of 0.2 microns and 10 microns. In a more particular embodiment, the retention layer 104b may have a thickness $T_R$ between 100 microns and 200 microns.

In an embodiment, referring to FIGS. 1-3, the tolerance ring 100 may have an inner radius $R_{R1}$ of at least 5 mm, at least 10 mm, at least 25 mm, at least 50 mm, at least 75 mm, at least 100 mm. The inner radius $R_{R1}$ may be no greater than 150 mm, no greater than 125 mm, no greater than 100 mm, no greater than 90 mm, no greater than 75 mm, no greater than 50 mm. The tolerance ring 100 may have an outer radius $R_{R2}$ of at least 5 mm, at least 10 mm, at least 25 mm, at least 50 mm, at least 75 mm, at least 100 mm. The tolerance ring 100 may have an outer radius $R_{R2}$ may be no greater than 150 mm, no greater than 125 mm, no greater than 100 mm, no greater than 90 mm, no greater than 75 mm, no greater than 50 mm. In a more particular embodiment, tolerance ring 100 may have an outer radius $R_{R2}$ between 3 mm and 150 mm.

In an embodiment, the tolerance ring 100 can have an axial length, $L_R$, as measured between axial ends 115, 117, of no greater than 500 mm, no greater than 250 mm, no greater than 150 mm, no greater than 100 mm, no greater than 50 mm, no greater than 25 mm. The tolerance ring 100 can have an axial length, $L_R$, as measured between axial ends 115, 117, of at least 5 mm, at least 10 mm, at least 25 mm, at least 50 mm, at least 100 mm, at least 250 mm. In a more particular embodiment, tolerance ring 100 may have can have an axial length, $L_R$, between 6 mm and 250 mm. The inner radius $R_{R1}$ may vary along the axial length $L_R$. The outer radius $R_{R2}$ may vary along the axial length $L_R$.

Referring to FIGS. 1-4, in a number of embodiments, at least one projection 120 may be at least partially coupled to the tolerance ring 100. In an embodiment, the projection 120 may be formed in the tolerance ring 100. The projection 120 can be monolithic with the sidewall 103, i.e., the projection 120 may have a unitary construction with the sidewall 103. In another particular embodiment, at least one of the projections 120 may comprise a separate component attached to the sidewall 103. For example, the separate component may be attached to the sidewall 103 by an adhesive, welding, crimping, or any other suitable process recognizable in the art. In an embodiment, the projection 120 may be located axially inward of an axial edge 115, 117 of the sidewall 103 of the tolerance ring 103. In an embodiment, at least one projection 120 can extend or protrude radially outward from the sidewall 103. In an embodiment, at least one projection 120 can extend or protrude radially inward from the sidewall 103. In an embodiment, as shown in FIGS. 1-3, at least one projection 120 can be oriented circumferentially down the sidewall 103 of the tolerance ring. In an alternative embodiment, at least one projection 120 can be oriented axially down the sidewall 103 of the tolerance ring. The projection 120 may be radially extending. In an embodiment, the projections 120 may be radially extending away from the central axis 600. In an embodiment, the projections 120 may be self-contained, discrete structures and may retain any grease applied before assembly and reduce or minimize subsequent leakage.

As depicted, the tolerance ring 100 can include one row, or band, of projections 120. In other aspects, the tolerance ring 100 can include two rows, or bands, of projections 120; three rows, or bands, of projections 120; etc. Further, a total number of projections 120, $N_{WS}$, in each row can be ≥3, such as ≥4, ≥5, ≥6, ≥7, ≥8, or ≥9. Further, $N_{WS}$≤30, ≤25, ≤20, or ≤15. $N_{WS}$ can be within a range between and including any of the $N_{WS}$ values above.

In an embodiment, the plurality of projections 120 can be disposed in at least two circumferentially extending rows. In a particular embodiment, the plurality of projections 120 may be disposed in at least 3 circumferentially extending rows, such as at least 4 circumferentially extending rows, at least 5 circumferentially extending rows, or even at least 6 circumferentially extending rows. In another embodiment, the plurality of projections 120 can be disposed in no greater than 25 circumferentially extending rows, such as no greater than 15 circumferentially extending rows, no greater than 10 circumferentially extending rows, or even no greater than 7 circumferentially extending rows.

In an embodiment, the projections 120 can each define an axial bisecting line. In an embodiment, the axial bisecting lines of at least two projections 120 can be oriented parallel, i.e., the at least two projections 120 may be oriented parallel to each other. In a more particular embodiment, all of the projections 120 can be oriented parallel with respect to each other.

In an embodiment, at least two projections 120 can extend from the sidewall 103 in different directions. In a more particular embodiment, at least two projections 120 can extend in opposite radial directions from the interior sidewall 103a and the exterior sidewall 103b. In a more particular embodiment, at least two projections 120 can extend in opposite axial directions. In an embodiment, at least two projections 120 may extend away from each other, i.e., the sides of at least two projections 120 may be closer together than any other portion of the projections 120.

Each projection 120 can define an aspect ratio as measured by a length thereof as compared to a width thereof. The projection 120 length may be defined as the larger dimension between length and width of the projection 120 in the axial or circumferential direction. The projection width may be defined as the smaller dimension of length and width of the projection 120 in the axial or circumferential direction. In an embodiment, at least one of the projections 120 can have an aspect ratio of at least 1.1:1, such as at least 1.5:1, at least 2:1, at least 3:1, at least 4:1, at least 5:1, or even at least 10:1. In an embodiment, the aspect ratio can be no greater than 100:1, such as no greater than 50:1, or even no greater than 25:1.

The projection 120 may be formed by a process, such as, for example, stamping, pressing, punching, or cutting. In an embodiment, at least one of the projections 120 may be formed prior to formation of the sidewall 103, e.g., prior to rolling a flat sheet to form the sidewall 103. In an embodiment, at least one of the projections 120 may be formed after formation of the sidewall 103, e.g., after rolling a flat sheet to form the sidewall 103.

In an embodiment, at least two of the projections 120 have the same geometric shape or size as compared to each other. In a further embodiment, all of the projections 120 may have the same geometric shape or size as compared to each other. In another embodiment, at least two of the projections 120 may have different geometric shapes or sizes as compared to each other. In a further embodiment, all of the projections 120 may have different geometric shapes or sizes as compared to each other.

The projections 120 may be carefully selected and designed for their force transfer or spring member properties. The geometry of the projections 120 may be selected to provide desired elastic/plastic deformation characteristics. For example, at least one of the projections 120 may be altered in geometry from another projection 120 to alter the rotational or axial movement of the projections 120. The deformation characteristics may be selected not only to take account of the manufacturing member tolerances of the inner and outer members 302, 306, but also to compensate for differential thermal expansion and wear that may occur between dissimilar components in operation, thus ensuring member the desired performance may be achieved throughout. These designs may be applicable to zero clearance tolerance rings 100 to ensure that the assembled components 302, 306 do not become loose at elevated temperatures.

As best depicted in FIGS. 1-3, the projections 120 may be polygonal in cross-section. In a number of embodiments, the projections 120 may have a polygonal, circular, or semicircular cross-section. In a number of embodiments, the projections 120 may include at least one shouldered or shoulderless wave structure 230. The at least one wave structure 230 can include a wave length $L_W$. In a number of embodiments, each wave structure 230 can include a wave body 240, a first wave side 242 on a first side of the wave body 240 and a second wave side 244 on a side second side of the wave body opposite first wave side 242. Each wave body 240 can include a generally arch shaped structure forming a plateau section 250 that extends between the upper unformed band 220 and the lower unformed band 222. Each wave body 240 can include a generally arch shaped structure that extends between the upper unformed band 220 and the lower unformed band 102. The wave structures 230 may have a first shoulder 246 and a second shoulder 248. The wave structures may be oriented as shown in FIG. 1, where the first shoulder 246 and second shoulder 248 extend in the axial direction, or may be oriented where the first shoulder 246 and second shoulder 248 extend in the radial direction. In another embodiment, the projections 120 may include a flat plateau section 250 with a smaller upper unformed band 220 and the lower unformed band 222.

As best depicted in FIG. 3, each wave body 240 can include a generally rectangular footprint 252 that represents the outer perimeter, or shape, of the wave body 240 prior to the formation of the wave sides 242, 244 depending on the embodiment. The footprint 252 may be surrounded by the unformed bands 220, 222 and adjacent unformed sections 224. The plateau section 250 may define the radial edge of the footprint 252. The footprint 252 can have a footprint length, $L_{WBF}$, and a footprint width, $W_{WBF}$. The projection 120 or plateau section 250 may have a height $H_P$, measured from the sidewall 103 to the peak of projection 120 or plateau section 250. In a particular aspect, the outer radius, $R_{R2}$, can be based on the height $H_P$ of the projection 120 or plateau section 250. $H_P$ can be ≤5% $R_{R2}$, such as ≤4% $R_{R2}$, ≤3% $R_{R2}$, ≤2% $R_{R2}$, or ≤1% $R_{R2}$. $H_P$ can be ≥0.1% $R_{R2}$, such as ≥0.2% $R_{R2}$, ≥0.3% $R_{R2}$, ≥0.4% $R_{R2}$, or ≥0.5% $R_{R2}$. Moreover, $H_P$ can be within a range between and including any of the % $R_{R2}$ values. Each wave side 242, 244 can include a length, $L_{WS}$. $L_{WS}$ can be ≥$L_{WBF}$, such as ≥101% $L_{WBF}$, ≥102% $L_{WBF}$, ≥103% $L_{WBF}$, ≥104% $L_{WBF}$, or ≥105% $L_{WBF}$. $L_{WS}$ can also be ≤125% $L_{WBF}$, such as ≤120% $L_{WBF}$, ≤115% $L_{WBF}$, or ≤110% $L_{WBF}$. Further, $L_{WS}$ can be within a range between and including any of the % $L_{WBF}$ values.

The wave sides 242, 244 can include an overall width, $W_{WS}$, measured between an outermost vertical edge 260 of the first wave side 242 and an outermost vertical edge 262 of the second wave side 244. $W_{WS}$ can be ≥$W_{WBF}$, such as ≥101% $W_{WBF}$, ≥102% $W_{WBF}$, ≥103% $W_{WBF}$, ≥104% $W_{WBF}$, or ≥105% $W_{WBF}$. Moreover, wherein $W_{WS}$ is ≤150% $W_{WBF}$, such as ≤145% $W_{WBF}$, ≤140% $W_{WBF}$, ≤135% $W_{WBF}$, ≤130% $W_{WBF}$, or ≤125% $W_{WBF}$. Further, $W_{WS}$ can be within a range between and including any of the % $W_{WBF}$ values.

In a particular aspect, as illustrated in FIG. 3, each wave body 240 comprises a base width, $W_{WBB}$, measured at an interface of each wave body 240 and the upper unformed band 220 or the lower unformed band 222, and a peak width, $W_{WBP}$, measured at a peak of each wave body 240. $W_{WBP}$ can be ≤$W_{WBB}$, such as ≤75% $W_{WBB}$, ≤70% $W_{WBB}$, ≤65% $W_{WBB}$, ≤60% $W_{WBB}$, ≤55% $W_{WBB}$, or ≤50% $W_{WBB}$. In another aspect, $W_{WBP}$ can be ≥25% $W_{WBB}$, such as ≥30% $W_{WBB}$, ≥35% $W_{WBB}$, or ≥40% $W_{WBB}$. Moreover, $W_{WBP}$ can be within a range between and including any of the 5% $W_{WBB}$ values.

The footprint 250 of the wave body 240 can include an area, $A_{FP}$, that is equal to, $H_{WBF} \times W_{WBF}$. The wave sides 242, 244 together can include a total area, $A_{WS}$, that is equal to the surface area of the material removed or altered in height from the unformed section 224 and the wave body 240 at each wave structure 230. $A_{WS}$ can be ≤$A_{FP}$, such as ≤80% $A_{FP}$, ≤75% $A_{FP}$, ≤70% $A_{FP}$, ≤65% $A_{FP}$, or ≤60% $A_{FP}$. In another aspect, $A_{WS}$ can be ≥25% $A_{FP}$, ≥30% $A_{FP}$, ≥35% $A_{FP}$, ≥40% $A_{FP}$, ≥45% $A_{FP}$, or ≥50% $A_{FP}$. Further, $A_{WS}$ can be within a range between and including any of the % $A_{FP}$ values.

In another aspect, $A_{WS}$ comprises an area that overlaps the wave body footprint, $A_{OFP}$, and an area that overlaps one or more unformed sections, the upper unformed band, the lower unformed band, or a combination thereof, $A_{OU}$. $A_{OU}$ can be ≤$A_{OFP}$, such as ≤45% $A_{OFP}$, ≤40% $A_{OFP}$, ≤35% $A_{OFP}$, ≤30% $A_{OFP}$, or ≤25% $A_{OFP}$. Moreover, $A_{OU}$ can be ≥1% $A_{OFP}$, such as ≥2% $A_{OFP}$, ≥3% $A_{OFP}$, ≥4% $A_{OFP}$, or ≥5% $A_{OFP}$. $A_{OU}$ can be within a range between and including any of the % $A_{OFP}$ values.

In yet another aspect, $A_{OU}$ can be ≤$A_{WS}$, such as ≤30% $A_{WS}$, ≤25% $A_{WS}$, ≤20% $A_{WS}$, or ≤15% $A_{WS}$. Also, $A_{OU}$ can be ≥1% $A_{WS}$, such as ≥2% $A_{WS}$, ≥3% $A_{WS}$, ≥4% $A_{WS}$, or ≥5% $A_{WS}$. $A_{OU}$ can be within a range between and including any of the % $A_{WS}$ values.

In another aspect, $A_{OFP}$ can be ≥70% $A_{WS}$, such as ≥75% $A_{WS}$, ≥80% $A_{WS}$, or ≥85% $A_{WS}$. Further, $A_{OFP} \leq A_{WS}$, such as ≤99% $A_{WS}$, ≤98% $A_{WS}$, ≤97% $A_{WS}$, ≤96% $A_{WS}$, or ≤95% $A_{WS}$. $A_{OFP}$ can be within a range between and including and of the $A_{WS}$ values.

FIG. 3 indicates that each wave side 242, 244 can include an inner arcuate edge 270, 272 that is adjacent to the wave body 240 and forms a first side edge and a second side edge of the wave body 240. Each arcuate edge 270, 272 can include an arc length, $L_{AE}$, and $L_{AE}$ can be ≥$H_{WBF}$, such as ≥101% $H_{WBF}$, ≥102% $H_{WBF}$, ≥103% $H_{WBF}$, ≥104% $H_{WBF}$, or ≥105% $H_{WBF}$. In another aspect, $L_{AE}$ can be ≤200% $H_{WBF}$, such as ≤175% $H_{WBF}$, ≤150% $H_{WBF}$, ≤145% $H_{WBF}$, ≤140% $H_{WBF}$, ≤135% $H_{WBF}$, ≤130% $H_{WBF}$, or ≤125% $H_{WBF}$. $L_{AE}$ can also be within a range between and including any of the % $H_{WBF}$ values.

In another aspect, each unformed section 224 can include a width, $W_{US}$, that is substantially the same as $W_{WBB}$. In this aspect, $W_{US}$ can be ≥60% $W_{WBB}$, such as ≥65% $W_{WBB}$, ≥70% $W_{WBB}$, ≥75% $W_{WBB}$, ≥80% $W_{WBB}$, ≥85% $W_{WBB}$, ≥90% $W_{WBB}$, ≥95% $W_{WBB}$, ≥96% $W_{WBB}$, ≥97% $W_{WBB}$, ≥98% $W_{WBB}$, ≥99% $W_{WBB}$, or ≥100% $W_{WBB}$. Further, $W_{US}$ can be ≤125% $W_{WBB}$, such as ≤120% $W_{WBB}$, ≤115% $W_{WBB}$, ≤110% $W_{WBB}$, ≤105% $W_{WBB}$, ≤104% $W_{WBB}$, ≤103% $W_{WBB}$, ≤102% $W_{WBB}$, or ≤101% $W_{WBB}$. $W_{US}$ can also be within a range between and including any of the % $W_{WBB}$ values.

Figure 5A:
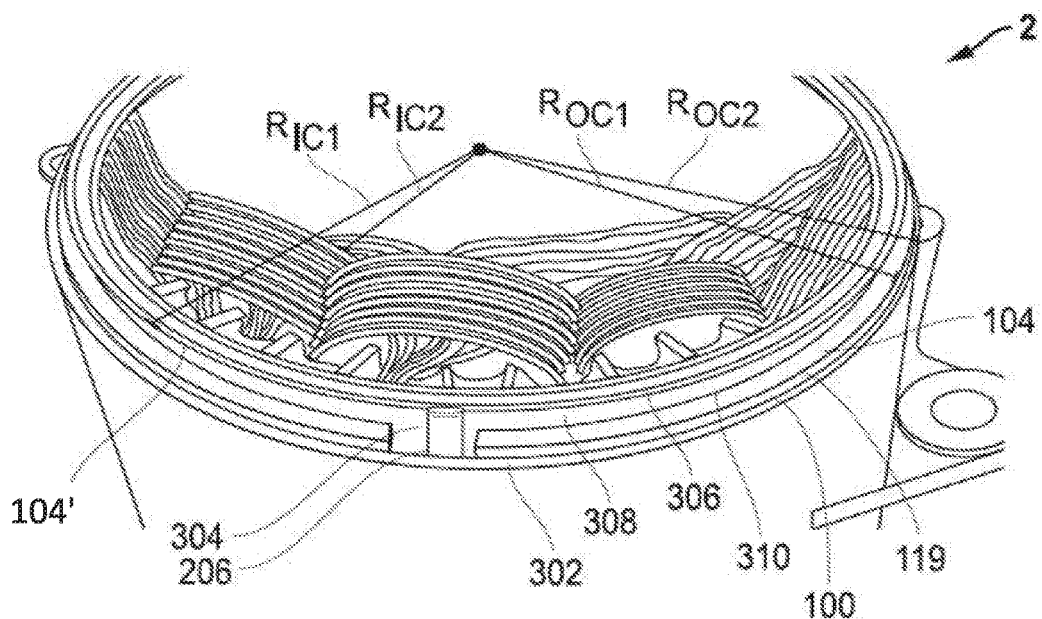
FIG. 5A is a perspective end view of one embodiment of an assembly.
Figure 5B:
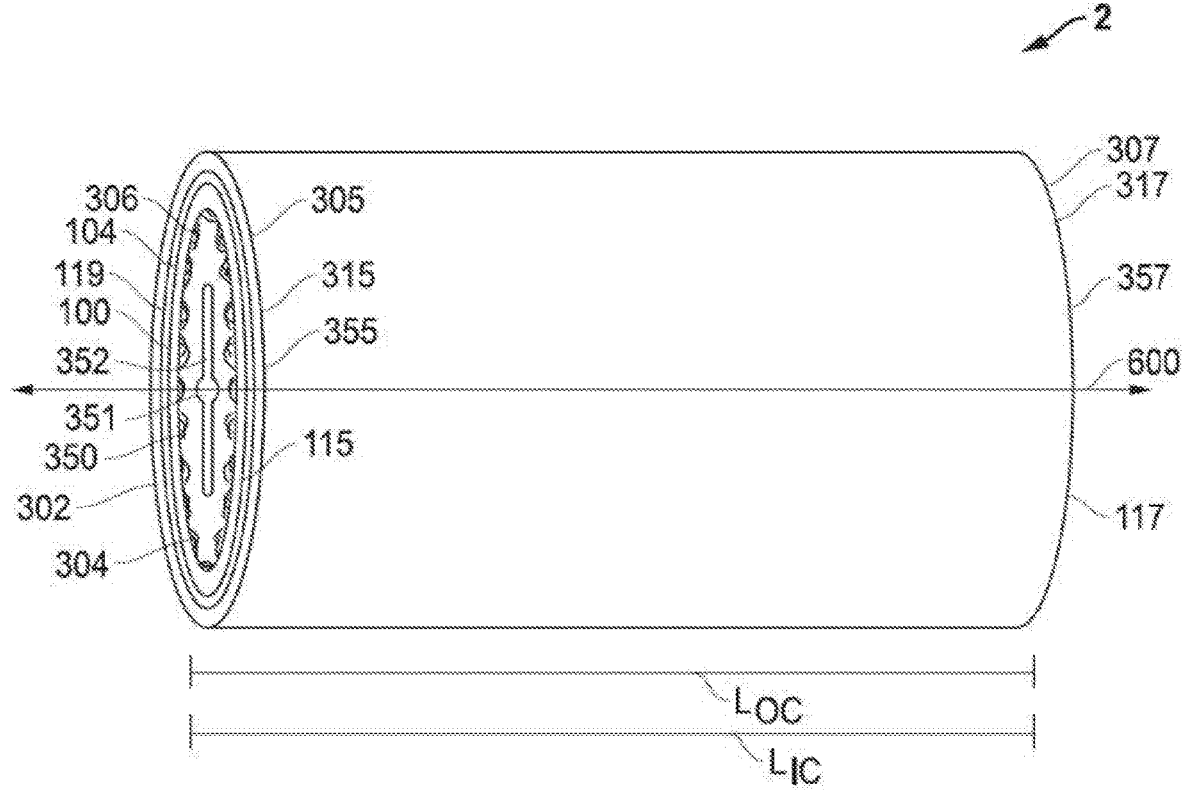
FIG. 5B is a perspective side view of one embodiment of an assembly.

FIGS. 5A-5B depict an assembly 2 which incorporates, for example, the tolerance ring 100 shown in FIGS. 1-3 according to a number of embodiments. The assembly 2 further includes an outer member 302, such as, but not limited to, a housing. The outer member 302 may have a first axial end 305 and a second axial end 307 along a central axis 600. The outer member 302 may have a bore 304 formed therein, which receives an inner member 306, such as but not limited to, a stator. The bore 304 may be provided in at least one of the radial or axial direction relative to the central axis 600. The inner member 306 may have a first axial end 315 and a second axial end 317. In a number of embodiments, the inner member 306 may be heat generating. In other words, the inner member 306 may be a part of a subassembly that generates heat via radiation, conduction, or convection. Tolerance rings 100 may be used to provide a fit between the outer member 302 and the inner member 306. When the tolerance ring 100 is mounted on the inner or outer member 302, 306 in an assembly 2, the projections 120 may act as guides to aid axial installation of the other component 302, 306. In a number of embodiments, the projections 120 of the tolerance ring 100 may face radially outward in the assembly 2 towards the housing or outer member 302. In a number of embodiments, the projections 120 of the tolerance ring 100 may face radially inward in the assembly 2 towards the stator or inner member 306. The assembly 2 also may include a rotor 350. The rotor 350 may have a first axial end 355 and a second axial end 357 along a central axis 600. The rotor 350 may include a shaft 351 and a plurality of blades 352. The rotor 350, may be adapted to rotate or otherwise move within the bore 304 of the assembly 2 to produce a torque around the rotor's axis and may produce electricity in assemblies such as generator assemblies (including, but not limited to, alternator assemblies), motor assemblies, engine assemblies, clutch assemblies, or holding mechanisms.

In a number of embodiments, an annular gap 206 may exist between an outer surface 308 of inner member 306 and an inner surface 310 of bore 304. The size of this annular gap 206 may be variable because the diameter of the inner member 306 and bore 304 may vary within tolerance ring dimensions listed above. In a number of embodiments, the tolerance ring 100 may have an inner radius $R_{R1}$ and an outer radius $R_{R2}$ tailored to be radially compressed between the inner member 306 and the outer member 302 to exert a radial force outward onto the outer member 302 and inward onto the inner member 306 to maintain a positional relationship therebetween. In a number of embodiments, the tolerance ring 100 may not be fixed to at least one of the inner member 306 or the outer member 302. In a number of embodiments, the tolerance ring 100 may be fixed to at least one of the inner member 306 or the outer member 302 through form fitting, force fitting, or bonding (including, but not limited to, adhesive bonding).

The adhesive used may include any known adhesive material common to the annular member arts including, but not limited to, fluoropolymers, an epoxy resins, a polyimide resins, a polyether/polyamide copolymers, ethylene vinyl acetates, Ethylene tetrafluoroethylene (ETFE), ETFE copolymer, perfluoroalkoxy (PFA), or any combination thereof. To prevent vibration of the inner member 306 within the bore 304, the annular gap 206 may be filled by tolerance ring 100 to form a zero-clearance fit between the components. The tolerance ring 100 may reduce the gap to zero so there may be no clearance between the components 302, 306 in assembly 2.

In an embodiment, the outer member 302 can include any material commonly used in the rotational, electric motor, electric generator, or alternator assembly arts. The outer member 302 can comprise any suitable material with sufficient rigidity to withstand axial and longitudinal forces. In a particular embodiment, the outer member 302 can comprise an injection molded polymer. In another embodiment, the outer member 302 can comprise a metal or alloy (such as, but not limited to, aluminum, zinc, copper, magnesium, tin, platinum, titanium, tungsten, lead, iron, bronze, steel, spring member steel, stainless steel) formed through a machining process. In yet another embodiment, the outer member 302 can comprise a ceramic or any other suitable material. The outer member 302 can be formed from a single piece, two pieces, or several pieces joined together by welding, adhesive, fasteners, threading, or any other suitable fastening means.

In an embodiment, the outer member 302 may have an inner radius $R_{OC1}$ from the central axis 600 of at least 5 mm, at least 10 mm, at least 15 mm, at least 20 mm, at least 30 mm, at least 40 mm. The inner radius $R_{OC1}$ may be no greater than 5 mm, no greater than 10 mm, no greater than 15 mm, no greater than 20 mm, no greater than 30 mm, no greater than 40 mm. The outer member 302 may have an outer radius $R_{OC2}$ of at least 5 mm, at least 10 mm, at least 15 mm, at least 20 mm, at least 30 mm, at least 40 mm. The outer radius $R_{OC2}$ may be no greater than 5 mm, no greater than 10 mm, no greater than 15 mm, no greater than 20 mm, no greater than 30 mm, no greater than 40 mm.

In an embodiment, the outer member 302 can have an axial length, $L_{OC}$, as measured between axial ends 115, 117, of no greater than 5 mm, no greater than 10 mm, no greater than 15 mm, no greater than 20 mm, no greater than 30 mm, no greater than 40 mm. The outer member 302 can have an axial length, $L_{OC}$, as measured between axial ends 115, 117, of at least 5 mm, at least 10 mm, at least 15 mm, at least 20 mm, at least 30 mm, at least 40 mm. The inner radius $R_{OC1}$ may vary along the axial length $L_{OC}$. The outer radius $R_{OC2}$ may vary along the axial length $L_{OC}$.

In an embodiment, the inner member 306 can include any material commonly used in the rotational, electric motor, electric generator, or alternator assembly arts. The inner member 306 can comprise any suitable material with sufficient rigidity to withstand axial and longitudinal forces. In a particular embodiment, the inner member 306 can comprise an injection molded polymer. In another embodiment, the inner member 306 can comprise a metal or alloy (such as, but not limited to, aluminum, zinc, copper, magnesium, tin, platinum, titanium, tungsten, lead, iron, bronze, steel, spring member steel, stainless steel) formed through a machining process. In yet another embodiment, the inner member 306 can comprise a ceramic or any other suitable material. The inner member 306 can be formed from a single piece, two pieces, or several pieces joined together by welding, adhesive, fasteners, threading, or any other suitable fastening means.

In an embodiment, the inner member 306 may have an inner radius $R_{IC1}$ from the central axis 600 of at least 5 mm, at least 10 mm, at least 15 mm, at least 20 mm, at least 30 mm, at least 40 mm. The inner radius $R_{IC1}$ may be no greater than 5 mm, no greater than 10 mm, no greater than 15 mm, no greater than 20 mm, no greater than 30 mm, no greater than 40 mm. The inner member 306 may have an outer radius $R_{IC2}$ of at least 5 mm, at least 10 mm, at least 15 mm, at least 20 mm, at least 30 mm, at least 40 mm. The outer radius $R_{IC2}$ may be no greater than 5 mm, no greater than 10 mm, no greater than 15 mm, no greater than 20 mm, no greater than 30 mm, no greater than 40 mm.

In an embodiment, the inner member 306 can have an axial length, $L_{IC}$, as measured between axial ends 115, 117, of no greater than 5 mm, no greater than 10 mm, no greater than 15 mm, no greater than 20 mm, no greater than 30 mm, no greater than 40 mm. The inner member 306 can have an axial length, $L_{IC}$, as measured between axial ends 115, 117, of at least 5 mm, at least 10 mm, at least 15 mm, at least 20 mm, at least 30 mm, at least 40 mm. The inner radius $R_{IC1}$ may vary along the axial length $L_{IC}$. The outer radius $R_{OC2}$ may vary along the axial length $L_{IC}$.

In use, the band 102 of the tolerance ring 100 may deform elastically when disposed between the components 302, 306 in the assembly 2. The other of the components 302, 306 may be mounted on the assembly 2, thereby compressing the tolerance ring in the gap 206 between the components 302, 306, preferably only the projections 120 deform. This deformation may be elastic or plastic, depending on the shape and/or profile of the projections 120 and the size of the gap 206.

In a number of embodiments, the tolerance ring 100 (including the substrate 119 and the overlying layer 104) may have a thermal transmittance between the inner member 306 and the outer member 302. In a number of embodiments, the thermal transmittance may be not greater than 1000, not greater than 750, not greater than 500, not greater than 400, not greater than 300, not greater than 250, not greater than 200, not greater than 150, not greater than 125, not greater than 100, not greater than 75, not greater than 50, not greater than 25, not greater than 10, or not greater than 5 W/m²K. In a number of embodiments, the thermal transmittance may be at least 10, at least 25, at least 50, at least 75, at least 100, at least 125, at least 150, at least 200, at least 250, at least 300, at least 400, at least 500, at least 750, at least 1000, at least 1500 W/m²K. In a number of embodiments, the thermal transmittance may be within the range of at least 300 but not greater than 600 W/m²K.

In a number of embodiments, the overlying layer 104 (including at least one of the thermal enhancement layer 104a or the retention layer 104b) may have a thermal conductivity between the inner member 306 and the outer member 302. In a number of embodiments, the contact conductance may be not greater than 1000, not greater than 750, not greater than 500, not greater than 400, not greater than 300, not greater than 250, not greater than 200, not greater than 150, not greater than 125, not greater than 100, not greater than 75, not greater than 50, not greater than 25, not greater than 10, or not greater than 5 W/m·K. In a number of embodiments, the thermal conductivity may be at least 10, at least 25, at least 50, at least 75, at least 100, at least 125, at least 150, at least 200, at least 250, at least 300, at least 400, at least 500, at least 750, at least 1000, at least 1500 W/m·K. In a number of embodiments, the thermal conductivity may be within the range of at least 300 but not greater than 600 W/m·K.

In a number of embodiments, the overlying layer 104 (including at least one of the thermal enhancement layer 104a or the retention layer 104b) may have a Vickers hardness. In a number of embodiments, the Vickers hardness may be not greater than 600, not greater than 550, not greater than 500, not greater than 450, not greater than 400, not greater than 350, not greater than 300, not greater than 325, not greater than 315, not greater than 300, not greater than 250, not greater than 200, not greater than 150, not greater than 100, or not greater than 50 VPN. In a number of embodiments, the Vickers hardness may be at least 50, at least 75, at least 100, at least 150, at least 200, at least 250, at least 300, at least 350, at least 400, at least 450, at least 500, at least 550, at least 600, at least 650, at least 700 VPN. In a particular embodiment, the Vickers hardness may be within the range of at least 300 and not greater than 400 VPN.

In an embodiment, the tolerance ring 100 can be installed or assembled in the assembly 2 by an assembly force, $A_f$, of at least 1 kgf in a longitudinal direction relative to the member 306 and the outer member 302, such as at least 2 kgf, at least 3 kgf, at least 4 kgf, at least 5 kgf, at least 10 kgf, or even at least 15 kgf. In a further embodiment, the assembly 2 can be installed or assembled by an assembly force, $A_f$, of no greater than 20 kg, such as no greater than 19 kgf, no greater than 18 kgf, no greater than 17 kgf, or even no greater than 16 kgf.

In an embodiment, the tolerance ring 100 can provide a retention force, $R_f$, of at least 1 kgf in a longitudinal direction relative to the member 306 and the outer member 302, such as at least 2 kgf, at least 3 kgf, at least 4 kgf, at least 5 kgf, at least 10 kgf, or even at least 15 kgf. In a further embodiment, the tolerance ring 100 can provide a retention force, $R_f$, of no greater than 20 kg, such as no greater than 19 kgf, no greater than 18 kgf, no greater than 17 kgf, or even no greater than 16 kgf. In a number of embodiments, $R_f > 0.1\ A_f$, such as $R_f > 0.2\ A_f$, $R_f > 0.3\ A_f$, $R_f > 0.4\ A_f$, $R_f > 0.5\ A_f$, $R_f > 0.6\ A_f$, $R_f > 0.7\ A_f$, $R_f > 0.8\ A_f$, $R_f > 0.9\ A_f$, or $R_f > 1\ A_f$.

In a number of embodiments, the tolerance ring 100 (including the substrate 119 and the overlying layer 104) may have an annular contact area percentage between the inner member 306 and the outer member 302 of at least 5%, such as at least 10%, at least 25%, at least 35%, at least 50%, at least 60%, at least 65%, at least 70%, at least 75%, at least 80%, at least 85%, at least 90%, at least 92%, at least 95%, at least 97%, at least 99%, at least 99.5%, or at least 99.9%. In a number of embodiments, the tolerance ring 100 (including the substrate 119 and the overlying layer 104) may have an annular contact area percentage between the inner member 306 and the outer member 302 of no greater than 99.9%, such as at no greater than 99.5%, no greater than 99%, no greater than 97%, no greater than 95%, no greater than 92%, no greater than 90%, no greater than 85%, no greater than 80%, no greater than 75%, no greater than 70%, no greater than 65%, no greater than 60%, no greater than 50%, no greater than 35%, no greater than 25%, no greater than 10%, or no greater than 5%. In a number of embodiments, the tolerance ring 100 (including the substrate 119 and the overlying layer 104) may have an annular contact area percentage between the inner member 306 and the outer member 302 in the range of 70% and 99.5%.

In a number of embodiments, the tolerance ring 100 (including the substrate 119 and the overlying layer 104) may have a coefficient of friction, μ, with the outer member 302 of no greater than 0.95, such as no greater than 0.9, no greater than 0.8, no greater than 0.7, no greater than 0.6, no greater than 0.5, no greater than 0.4, no greater than 0.3, no greater than 0.2, or even no greater than 0.1. In a number of embodiments, the tolerance ring 100 (including the substrate 119 and the overlying layer 104) may have a coefficient of friction, a, with the outer member 302 of no less than 0.05, such as no less than 0.07, no less than 0.1, no less than 0.15, no less than 0.2, no less than 0.25, or even no less than 0.3. In a number of embodiments, the tolerance ring 100 (including the substrate 119 and the overlying layer 104) may have a coefficient of friction, a, with the outer member 302 in the range of 0.12 and 0.95.

In a number of embodiments, the overlying layer 104 (including at least the retention layer 104b) may have a coefficient of friction, $\mu_1$, with the outer member 302 of no greater than 0.95, such as no greater than 0.9, no greater than 0.8, no greater than 0.7, no greater than 0.6, no greater than 0.5, no greater than 0.4, no greater than 0.3, no greater than 0.2, or even no greater than 0.1. In a number of embodiments, overlying layer 104 (including at least the retention layer 104b) may have a coefficient of friction, with the outer member 302 of no less than 0.05, such as no less than 0.07, no less than 0.1, no less than 0.15, no less than 0.2, no less than 0.25, or even no less than 0.3. In a number of embodiments, overlying layer 104 (including at least the retention layer 104b) may have a coefficient of friction, u, with the outer member 302 in the range of 0.12 and 0.95.

In a number of embodiments, the substrate 119 may have a coefficient of friction, $\mu_2$, with the outer member 302 of no greater than 0.95, such as no greater than 0.9, no greater than 0.8, no greater than 0.7, no greater than 0.6, no greater than 0.5, no greater than 0.4, no greater than 0.3, no greater than 0.2, or even no greater than 0.1. In a number of embodiments, the substrate 119 may have a coefficient of friction, $\mu_2$, with the outer member 302 of no less than 0.05, such as no less than 0.07, no less than 0.1, no less than 0.15, no less than 0.2, no less than 0.25, or even no less than 0.3. In a number of embodiments, the substrate 119 may have a coefficient of friction, $\mu_2$, with the outer member 302 in the range of 0.12 and 0.95. In a number of embodiments, $\mu_1 > \mu_2$, such as $\mu_1 > \mu_2$, $\mu_1 > 1.1\mu_2$, $\mu_1 > 1.2\mu_2$, $\mu_1 > 1.5\mu_2$, $\mu_1 > 2\mu_2$, or $\mu_1 > 3\mu_2$.

In a number of embodiments, the tolerance ring 100 (including the substrate 119 and the overlying layer 104) can have a surface roughness of at least about 1 micron, such as at least about 2 microns, or about 5 microns, at least about 10 microns, or even at least about 100 microns. The surface roughness of the tolerance ring 100 (including the substrate 119 and the overlying layer 104) can be no greater than about 200 microns, such as no greater than about 150 microns, not greater than about 100 microns, or even no greater than about 80 microns. In a number of embodiments, the tolerance ring 100 (including the substrate 119 and the overlying layer 104) may have a surface roughness in the range of 1 and 100 microns.

In some embodiments, the tolerance ring 100 may be secured on one of the inner or outer members 302, 306. For example, the tolerance ring 100 may be secured or retained by resilient gripping of the band 102 on the inner member 306. In this example, the overlying layer 104 may be provided only on the inner surface of the band 102 and the projections 120 may extend radially outwardly from the band 102, e.g., toward the outer member 302. In a number of embodiments, the outer surface may not have the overlying layer 104 and may therefore provide more resistance to relative motion. The tolerance ring 100 may be prevented from undesired movement within the bore 304. The outer member 302 or inner member 306 may also be prevented from undesired within the bore 304. In some embodiments, at the surfaces of contact between the outer member 302 and the outer surfaces of the band 102, there may be sufficient frictional force to retain the tolerance ring 100 in place relative to the outer member 302. The tolerance ring 100 may be secured relative to the outer member 302 or inner member 306 by frictional engagement at the contact area between the band 102 and their surfaces to provide a radial compression such that very little or substantially no radial, axial, or circumferential movement takes place between the outer member 302 and the inner member 306 due to the fit of the tolerance ring 100.

The tolerance ring 100 may be formed with projections 120 that may be designed to achieve spring member characteristics as required for the particular force control application intended. This allows tolerance rings 100 to be designed to fulfill force control functions not possible within the usual envelope of performance achieved by variation of tolerance ring geometry alone.

Typically, the mating components of the assembly 2 and the tolerance ring projections 120 themselves have dimensional variability within given tolerances. Thus, the actual amount of compression of the projections 120, and hence the forces generated in the assembly 2, can vary from assembly 2 to assembly 2. However, if the projections 120 are compressed beyond their 'elastic zone' they behave progressively more plastically, limiting further increase in force from any further compression. This effect may be important where tolerance rings 100 provide sliding force control (either axially or rotationally) to minimize force variation due to compression variation, where the projections 120 may be designed to be compressed into their 'plastic zone.'

As stated above, the projections 120 may be arranged to project away from the band 102 to provide a plurality of discrete contact surfaces with one of the inner and outer members 302, 306. The projections 120 may be configured to deform or compress. This may include elastic deformation at the discrete contact surfaces to transmit the load force radially through the tolerance ring 100 between the inner and outer members 302, 306. The shape and size of each projection 120 may be selected based on the particular application. In a number of embodiments, the projections 120 may be capable of transmitting relatively high radial forces (e.g., 200 N or more) to locate stably and provide radial stiffness between the inner and outer member 302, 306. In a number of variations, the projections 120 of the tolerance ring may provide a radial stiffness between the inner and outer members 302, 306 of no less than about 1,000 N/mm, of such as no less than about 1100 N/mm, such as no less than about 1200 N/mm, no less than about 1300 N/mm, no less than about 1500 N/mm, no less than about 1700 N/mm, no less than about 2000 N/mm, no less than about 2100 N/mm, no less than about 2200 N/mm, no less than about 2300 N/mm, no less than about 2400 N/mm, no less than about 2500 N/mm, no less than about 3000 N/mm, no less than about 3500 N/mm, or even no less than about 4000 N/mm. In yet other embodiments, the projections 120 of the tolerance ring may provide a radial stiffness between the inner and outer members 302, 306 of no greater than about 7500 N/mm, such as no greater than about 7000 N/mm, no greater than about 6500 N/mm, no greater than about 6000 N/mm, no greater than about 5500 N/mm, or even no greater than about 5000 N/mm. Each projection 120 comprises a footprint region where its edges meet the band 102. The area of the footprint region may be relatively small, which, in combination with the overlying layer 104, reduces the frictional forces.

According to still another aspect, there may be provided a method including providing an inner member 306 and an outer member 302. The method may further include providing a tolerance ring 100 between the inner member 306 and the outer member 302 where the tolerance ring has a plurality of projections protruding radially inward or radially outward, where the tolerance ring includes a substrate, and an overlying layer including at least one of a thermal enhancement layer and a retention layer, the thermal enhancement layer including at least one of i) Vickers hardness <400 VPN or ii) a thermal conductivity >100 W/m·K, the tolerance ring being adapted to provide at least one of a) a thermal transfer between the inner member and the outer member, b) a coefficient of friction between the retention layer and the outer member, $\mu 1$, and a coefficient of friction between the substrate and the outer member, $\mu 2$, and where $\|1>\mu 2$, or c) a retention force, Rf, between the inner member and the outer member, and the assembly has an assembly force, Af, and where Rf>0.1 Af.

In a number of embodiments, the assembly 2 as shown in FIGS. 5A-5B may differentiate from commonly used sliding or rotational assemblies by providing at least one of low weight and space requirements; good damping of impacts, shocks, and vibrations of the assembly 2; low installation and maintenance efforts; decreasing of parts or complexity of parts; smaller tolerancing requirements; less complex assembly procedures; less complex mechanisms; reduced joint stiffness to isolate palier from stator vibration; improved magnetic noise qualities; grease-free operation; or corrosion resistance. In a number of embodiments, the tolerance ring 100 may provide improved heat transfer through increased joint conductance between the inner member 306 and the outer member 302 with the tolerance ring by filling micro voids in the surfaces of these parts with the overlying layer 104 of the tolerance ring 100, and/or by changing the shape of the projections 120 to create more contact with at least one of the inner member 306 or the outer member 302. In a number of embodiments, the tolerance ring 100 may improve an improved retention force with at least one of the inner member 306 or the outer member 302 due to the smearing of the overlying layer 104 on at least one of the inner member 306 or the outer member 302 during use of the assembly 2.

Many different aspects and embodiments are possible. Some of those aspects and embodiments are described below. After reading this specification, skilled artisans will appreciate that those aspects and embodiments are only illustrative and do not limit the scope of the present invention. Embodiments may be in accordance with any one or more of the embodiments as listed below.

Embodiment 1

A tolerance ring comprising: a substrate, and an overlying layer comprising a thermal enhancement layer comprising at least one of Vickers hardness <400 VPM or a thermal conductivity >100 W/m·K, wherein the tolerance ring comprises a plurality of projections protruding radially inward or radially outward, and wherein the thermal enhancement layer defines a portion of the an exterior surface of the tolerance ring.

Embodiment 2

An assembly comprising: an inner member; an outer member; and a tolerance ring disposed between inner member and outer member, wherein the tolerance ring comprises a plurality of projections protruding radially inward or radially outward, wherein the tolerance ring comprises: a substrate, and an overlying layer comprising a retention layer, wherein a) the tolerance ring provides a coefficient of friction between the retention layer and the outer member, $\mu_1$, and a coefficient of friction between the substrate and the outer member, $\mu_2$, and wherein $\mu_1 > \mu_2$, or b) wherein the tolerance ring provides a retention force, $R_f$, between the inner member and the outer member, and the assembly has an assembly force, $A_f$, and wherein $R_f > 0.1 A_f$.

Embodiment 3

An assembly comprising: a heat generating inner member; an outer member; and a tolerance ring disposed between inner member and outer member, wherein the tolerance ring comprises a plurality of projections protruding radially inward or radially outward, wherein the tolerance ring comprises: a substrate, and an overlying layer comprising a thermal enhancement layer and a retention layer, the thermal enhancement layer comprising at least one of i) Vickers hardness <400 VPM or ii) a thermal conductivity >100 W/m·K, the tolerance ring being adapted to provide thermal transfer between the inner member and the outer member, wherein the tolerance ring provides a coefficient of friction between the retention layer and the outer member, $\mu_1$, and a coefficient of friction between the substrate and the outer member, $\mu_2$, and wherein $\mu_1 > \mu_2$, and wherein the tolerance ring provides a retention force, $R_f$, between the inner member and the outer member, and the assembly has an assembly force, $A_f$, and wherein $R_f > 0.1 A_f$.

Embodiment 4

A tolerance ring or assembly of any of embodiments 1 and 3, wherein the thermal enhancement layer comprises both a Vickers hardness <400 VPM and a thermal conductivity >100 W/m·K.

Embodiment 5

A tolerance ring or assembly of any of the preceding embodiments, wherein the projections protrude radially outward.

Embodiment 6

An assembly of any of embodiments 2-5, wherein $R_f > 0.35 A_f$, such as $R_f > 0.4 A_f$, $R_f > 0.5 A_f$, $R_f > 0.6 A_f$, $R_f > 0.7 A_f$, $R_f > 0.8 A_f$, $R_f > 0.9 A_f$, or $R_f > 1 A_f$.

Embodiment 7

An assembly of any of embodiments 2-6, wherein the inner member comprises a stator, and the outer member comprises a housing.

Embodiment 8

A tolerance ring or assembly of any of the preceding embodiments, wherein the overlying layer comprises a deposited coating.

Embodiment 9

A tolerance ring or assembly of any of the preceding embodiments, wherein the overlying layer comprises a cladding.

Embodiment 10

A tolerance ring or assembly of any of the preceding embodiments, wherein the substrate comprises steel.

Embodiment 11

A tolerance ring or assembly of embodiment 10, wherein the metal comprises a carbon steel or stainless steel.

Embodiment 12

A tolerance ring or assembly of any of the preceding embodiments, wherein the thermal enhancement layer comprises a metal comprising at least one of zinc, copper, magnesium, nickel, tin, lead, aluminum, or an alloy thereof.

Embodiment 13

A tolerance ring or assembly of any of the preceding embodiments, wherein the overlying layer has a thickness within the range of 10 microns to 200 microns.

Embodiment 14

A tolerance ring or assembly of any of the preceding embodiments, wherein the substrate has a thickness within the range of 0.075 mm to 0.8 mm.

Embodiment 15

A tolerance ring or assembly of any of the preceding embodiments, wherein the tolerance ring has an outer radius within the range of 3 mm to 150 mm.

Embodiment 16

A tolerance ring or assembly of any of the preceding embodiments, wherein the tolerance ring has an axial gap.

Embodiment 17

A tolerance ring or assembly of any of the preceding claims, wherein the tolerance ring has a length within the range of 6 mm to 250 mm.

Embodiment 18

A tolerance ring or assembly of any of the preceding embodiments, wherein the projections deform between the inner member and the outer member.

This written description uses examples, including the best mode, and also to enable those of ordinary skill in the art to make and use the invention. The patentable scope of the invention is defined by the claims, and may include other examples that occur to those skilled in the art. Such other examples are intended to be within the scope of the claims if they have structural elements that do not differ from the literal language of the claims, or if they include equivalent structural elements with insubstantial differences from the literal languages of the claims. For example, embodiments may relate to rotational devices such as an electric motor, such as a windshield wiper motor, or axial sliding applications, such as a tolerance ring column adjustment mechanism.

While embodiments have been shown or described in only some of forms, it should be apparent to those skilled in the art that they are not so limited, but are susceptible to various changes without departing from the scope of the invention.

The invention claimed is:

1. A tolerance ring comprising:
   a substrate, and
   an overlying layer comprising a thermal enhancement layer comprising at least one of a Vickers hardness <400 VPN or a thermal conductivity >100 W/m·K, wherein the thermal enhancement layer comprises a plurality of discrete projections protruding radially inward or radially outward, and wherein the thermal enhancement layer defines a portion of an exterior surface of the tolerance ring, wherein the thermal enhancement layer comprises a metal comprising at least two of aluminum, zinc, copper, beryllium, magnesium, tin, titanium, tungsten, iron, bronze, or alloys thereof, wherein at least one of the plurality of projections is a self-contained, discrete structure.

2. A tolerance ring of claim 1, wherein the thermal enhancement layer comprises both a Vickers hardness <400 VPN and a thermal conductivity >100 W/m·K.

3. A tolerance ring of claim 1, wherein the projections protrude radially outward.

4. A tolerance ring of claim 1, wherein the overlying layer comprises a deposited coating.

5. A tolerance ring of claim 1, wherein the overlying layer comprises a cladding.

6. A tolerance ring of claim 1, wherein the substrate comprises steel.

7. A tolerance ring of claim 6, wherein the substrate comprises a carbon steel or stainless steel.

8. A tolerance ring of claim 1, wherein the thermal enhancement layer comprises a metal comprising at least one of zinc, copper, magnesium, nickel, tin, lead, aluminum, or an alloy thereof.

9. A tolerance ring of claim 1, wherein the overlying layer has a thickness within the range of 10 microns to 200 microns.

10. A tolerance ring of claim 1, wherein the substrate has a thickness within the range of 0.075 to 0.8 mm.

11. A tolerance ring of claim 1, wherein the tolerance ring has an outer radius within the range of 3 mm to 150 mm.

12. A tolerance ring of claim 1, wherein the tolerance ring has an axial gap.

13. A tolerance ring of claim 1, wherein the tolerance ring has a length within the range of 6 mm to 250 mm.

14. A tolerance ring of claim 1, wherein the projections protrude radially inward.

15. A tolerance ring of claim 1, wherein the overlying layer comprises a thermal enhancement layer comprising a thermal conductivity >100 W/m·K.

16. A tolerance ring of claim 1, wherein at least one of the plurality of projections is polygonal in cross section.

17. A tolerance ring of claim 1, wherein at least one of the plurality of projections has a shouldered wave structure.

18. A tolerance ring of claim 1, wherein at least one of the plurality of projections has a shoulderless wave structure.

19. A tolerance ring of claim 1, wherein at least one of the plurality of projections has a first shoulder and a second shoulder.

20. A tolerance ring comprising:
    a substrate, and
    an overlying layer comprising a thermal enhancement layer comprising at least one of a Vickers hardness <400 VPN and a thermal conductivity >100 W/m·K, wherein the thermal enhancement layer comprises a plurality of discrete projections protruding radially inward or radially outward, and wherein the thermal enhancement layer defines a portion of an exterior surface of the tolerance ring, wherein the thermal enhancement layer comprises a metal comprising at least one of aluminum, zinc, beryllium, magnesium, tin, titanium, tungsten, iron, bronze, or alloys thereof, wherein at least one of the plurality of projections is a self-contained, discrete structure.

* * * * *